(12) United States Patent
Chen et al.

(10) Patent No.: US 12,099,823 B2
(45) Date of Patent: Sep. 24, 2024

(54) REDUCING REGISTER PRESSURE

(71) Applicant: International Business Machines Corporation, Armonk, NY (US)

(72) Inventors: Zheng Chen, Shanghai (CN); Ke Wen Lin, Shanghai (CN); Si Yuan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 18/097,307

(22) Filed: Jan. 16, 2023

(65) Prior Publication Data

US 2024/0241704 A1  Jul. 18, 2024

(51) Int. Cl.
  *G06F 9/30* (2018.01)
  *G06F 8/41* (2018.01)
(52) U.S. Cl.
  CPC ........ *G06F 8/4441* (2013.01); *G06F 9/30112* (2013.01)
(58) Field of Classification Search
  None
  See application file for complete search history.

(56) References Cited

U.S. PATENT DOCUMENTS

| | | | | |
|---|---|---|---|---|
| 9,189,375 B1* | 11/2015 | Bastien | ............... | G06F 11/3612 |
| 9,436,447 B2* | 9/2016 | Kong | ...................... | G06F 8/456 |
| 11,372,629 B1* | 6/2022 | Meister | ..................... | G06N 3/08 |
| 2003/0237080 A1* | 12/2003 | Thompson | .............. | G06F 8/441 |
| | | | | 712/241 |
| 2005/0050533 A1* | 3/2005 | Koseki | ..................... | G06F 8/441 |
| | | | | 717/130 |
| 2006/0048123 A1* | 3/2006 | Martin | .................. | G06F 8/4452 |
| | | | | 717/160 |
| 2010/0042815 A1* | 2/2010 | Gonion | ................. | G06F 9/3001 |
| | | | | 712/E9.016 |

(Continued)

FOREIGN PATENT DOCUMENTS

WO  WO-2022057288 A1 *  3/2022  ........... G06F 8/4441

OTHER PUBLICATIONS ip.com, "Method of Register Pressure Guided Loop Distribution," IP.com No. IPCOM000213138D, Dec. 5, 2011, pp. 1-3.

*Primary Examiner* — Philip Wang
(74) *Attorney, Agent, or Firm* — Shackelford, McKinley & Norton, LLP; Robert A. Voigt, Jr.

(57) ABSTRACT

A computer-implemented method, system and computer program product for reducing register pressure. Loops of a computer program with a number of live variables that exceeds a threshold number, such as the number of available registers with capacity to store data, are identified. Such identified loops may be the to be subject to high register pressure. Upon identifying such loops in the computer program, chains within each identified loop are identified, where each chain includes load and store instructions from the same induction address and where the variable offsets of the load and store instructions are loop invariants. The address expressions for the load and store instructions in the identified chains may then be modified or changed to reuse common variable offsets using an analysis and transformation process. By reusing common variable offsets, there are less variable offsets that need to be stored in the registers thereby mitigating register pressure.

20 Claims, 9 Drawing Sheets

(56) References Cited

U.S. PATENT DOCUMENTS

| | | | |
|---|---|---|---|
| 2013/0111453 A1* | 5/2013 | Kalogeropulos | G06F 8/4452 717/161 |
| 2013/0117734 A1* | 5/2013 | Kong | G06F 8/41 717/149 |
| 2014/0164745 A1* | 6/2014 | Mehrara | G06F 9/3012 712/226 |
| 2020/0065073 A1* | 2/2020 | Pan | G06T 1/20 |
| 2021/0149673 A1* | 5/2021 | Li | G06F 9/463 |
| 2021/0311708 A1* | 10/2021 | Li | G06F 8/4442 |
| 2023/0029183 A1* | 1/2023 | Ji | G06F 8/433 |
| 2024/0197268 A1* | 6/2024 | Stanton | A61B 6/4405 |

* cited by examiner

```
305 ─; Liveins: offset1_1, ... offsetM_N
301 ─ LOOP: {
  302 ─; base is a induction address.
  303 ─; offset1_1, ... offsetM_N are all loop invariants.
  304 ─; Value V1_1, ... VM_N are all used inside loop.

V1_1 = load(base+offset1_1);
    V1_2 = load(base+offset1_2);
    ...
    V1_N = load(base+offset1_n);
    V2_1 = load(base+offset2_1);
    V2_2 = load(base+offset2_2);
    ...
    V2_N = load(base+offset2_N);
    ...
    VM_N = load(base+offsetM_N);
    ...
    Use (V1_1, V1_2 ... VM_N);
}
```

FIG. 3

```
305 ─; Liveins: base1, ..., baseM, offset1, ..., offsetN          400
301 ─LOOP: {
  302 ─; base is a induction address.
         ; Value V1_1, ... VM_N are all used inside loop.

401A ─; the first chain, NEW base is base+base1
         V1_1 = load(base+base1+offset1);
         V1_2 = load(base+base1+offset2);
         ...
         V1_N = load(base+base1+offsetN);

401B ─; the second chain, NEW base is base+base2
         V2_1 = load(base+base2+offset1);
         V2_2 = load(base+base2+offset2);
         ...
         V2_N = load(base+base2+offsetN);

...
  401M ─VM_N = load(base+baseM+offsetN);

...
         Use (V1_1, V1_2 ... VM_N;
      }
```

FIG. 4

```
#define EXPR(x) double *base##x=input+i+offset*x;
double foo(double *input,
           unsigned offset,
           int count)
{
    double res = 1.0;
      for (long long i = 0; i < count; i++) {
        EXPR(1); EXPR(2); EXPR(5); EXPR(10);
        EXPR(21); EXPR(22); EXPR(25); EXPR(30);
        EXPR(41); EXPR(42); EXPR(43); EXPR(45);
        EXPR(61); EXPR(62); EXPR(65); EXPR(70);
        // more EXPRs...
        // load values from base##x to v##x
        res += v1 * v2 * v5 * v10
            * v21 * v22 * v25 * v30
            * v41 * v42 * v43 * v45
            * v61 * v62 * v65 * v70
            //... more values
      }
}
```

FIG. 8

REDUCING REGISTER PRESSURE

TECHNICAL FIELD

The present disclosure relates generally to register pressure of loops, and more particularly to reducing register pressure by changing the address expressions for load/store instructions to reuse common offsets in a loop of a function.

BACKGROUND

In many programming languages, the programmer may use any number of variables. A "variable" is an abstract storage location paired with an associated symbolic name, which contains some known or unknown quantity of information referred to as a value. A variable can be associated with or identified by a memory address. A computer program typically runs faster when such variables are stored in the CPU's registers. However, the number of registers is limited. Therefore, when the compiler (a computer program that translates computer code written in one programming language (the source language) into another language (the target language)) is translating code to machine-language, it must decide how to allocate variables to the limited number of registers in the CPU.

Not all variables are in use (or "live") at the same time, and so, over the lifetime of a program, a given register may be used to hold different variables. However, two variables in use at the same time cannot be assigned to the same register without corrupting one of the variables. If there are not enough registers to hold all the variables, some variables may be moved to and from memory (e.g., RAM). This process is called "spilling" the registers. Accessing memory (e.g., RAM) is significantly slower than accessing registers and so a compiled program runs slower. Therefore, an optimizing compiler aims to assign as many variables to available free registers as possible.

"Register pressure" measures the availability of free registers at any point in time during the program execution. That is, register pressure corresponds to the number of simultaneously live variables at an instruction.

Register pressure is high when a large number of the available registers are in use; thus, the higher the register pressure, the more often the register contents must be spilled into memory. Increasing the number of registers in an architecture decreases register pressure but increases the cost.

Register pressure is especially an issue involving certain applications, such as artificial intelligence and machine learning applications, which utilize an enormous amount of data that is computationally intensive. In such applications, data may involve a large number of variables and computations, which may result in high register pressure, which may result in spills (storing the variables in memory) and reloads (loading stored variables from memory) inside a hot loop (a region of instructions where a large amount of time is spent during the program's execution).

There have been various register allocation algorithms (e.g., greedy register allocation, linear scan register allocation, Partitioned Boolean Quadratic Problem) developed in an attempt to minimize register pressure. Unfortunately, such attempts have failed to adequately reduce register pressure, including in situations involving hot loops.

SUMMARY

In one embodiment of the present disclosure, a computer-implemented method for reducing register pressure comprises identifying loops of a program with a number of live variables that exceeds a threshold number. The method further comprises identifying one or more chains within each identified loop, where each of the one or more chains comprises load and store instructions from a same induction address, and where variable offsets of the load and store instructions are loop invariants. The method additionally comprises modifying addresses expressions for the load and store instructions in each of the one or more chains to reuse common variable offsets.

In this manner, register spills are mitigated or even eliminated by identifying chains within a loop of a function that is subject to high register pressure (i.e., the number of live variables exceeds a threshold number). In such chains, the load and store instructions have the same induction address (base address) and the variable offsets of the load and store instructions are loop invariants (values that are not changed at every iteration of the loop). An analysis and transformation is then performed in such chains whereby variable offsets are reused, such as by smaller chains within such identified chains, thereby reducing register pressure.

In another embodiment of the present disclosure, a computer program product for reducing register pressure, where the computer program product comprises one or more computer readable storage mediums having program code embodied therewith, where the program code comprising programming instructions for identifying loops of a program with a number of live variables that exceeds a threshold number. The program code further comprises the programming instructions for identifying one or more chains within each identified loop, where each of the one or more chains comprises load and store instructions from a same induction address, and where variable offsets of the load and store instructions are loop invariants. The program code additionally comprises the programming instructions for modifying addresses expressions for the load and store instructions in each of the one or more chains to reuse common variable offsets.

In this manner, register spills are mitigated or even eliminated by identifying chains within a loop of a function that is subject to high register pressure (i.e., the number of live variables exceeds a threshold number). In such chains, the load and store instructions have the same induction address (base address) and the variable offsets of the load and store instructions are loop invariants (values that are not changed at every iteration of the loop). An analysis and transformation is then performed in such chains whereby variable offsets are reused, such as by smaller chains within such identified chains, thereby reducing register pressure.

In a further embodiment of the present disclosure, a system comprises a memory for storing a computer program for reducing register pressure and a processor connected to the memory. The processor is configured to execute program instructions of the computer program comprising identifying loops of a program with a number of live variables that exceeds a threshold number. The processor is further configured to execute the program instructions of the computer program comprising identifying one or more chains within each identified loop, where each of the one or more chains comprises load and store instructions from a same induction address, and where variable offsets of the load and store instructions are loop invariants. The processor is additionally configured to execute the program instructions of the computer program comprising modifying addresses expressions for the load and store instructions in each of the one or more chains to reuse common variable offsets.

In this manner, register spills are mitigated or even eliminated by identifying chains within a loop of a function that is subject to high register pressure (i.e., the number of live variables exceeds a threshold number). In such chains, the load and store instructions have the same induction address (base address) and the variable offsets of the load and store instructions are loop invariants (values that are not changed at every iteration of the loop). An analysis and transformation is then performed in such chains whereby variable offsets are reused, such as by smaller chains within such identified chains, thereby reducing register pressure.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 3 is pseudocode illustrating a chain within a loop, where the load and store instructions are from the same induction address and the variable offsets of the load and store instructions are loop invariants, in accordance with an embodiment of the present disclosure;

FIG. 4 is pseudocode illustrating the generation of M smaller chains among a chain of the loop whereby N variable offsets are reused among the M smaller chains in accordance with an embodiment of the present disclosure;

FIG. 8 illustrates code involving a chain of a loop of a function in accordance with an embodiment of the present disclosure.

DETAILED DESCRIPTION

Figure 1:
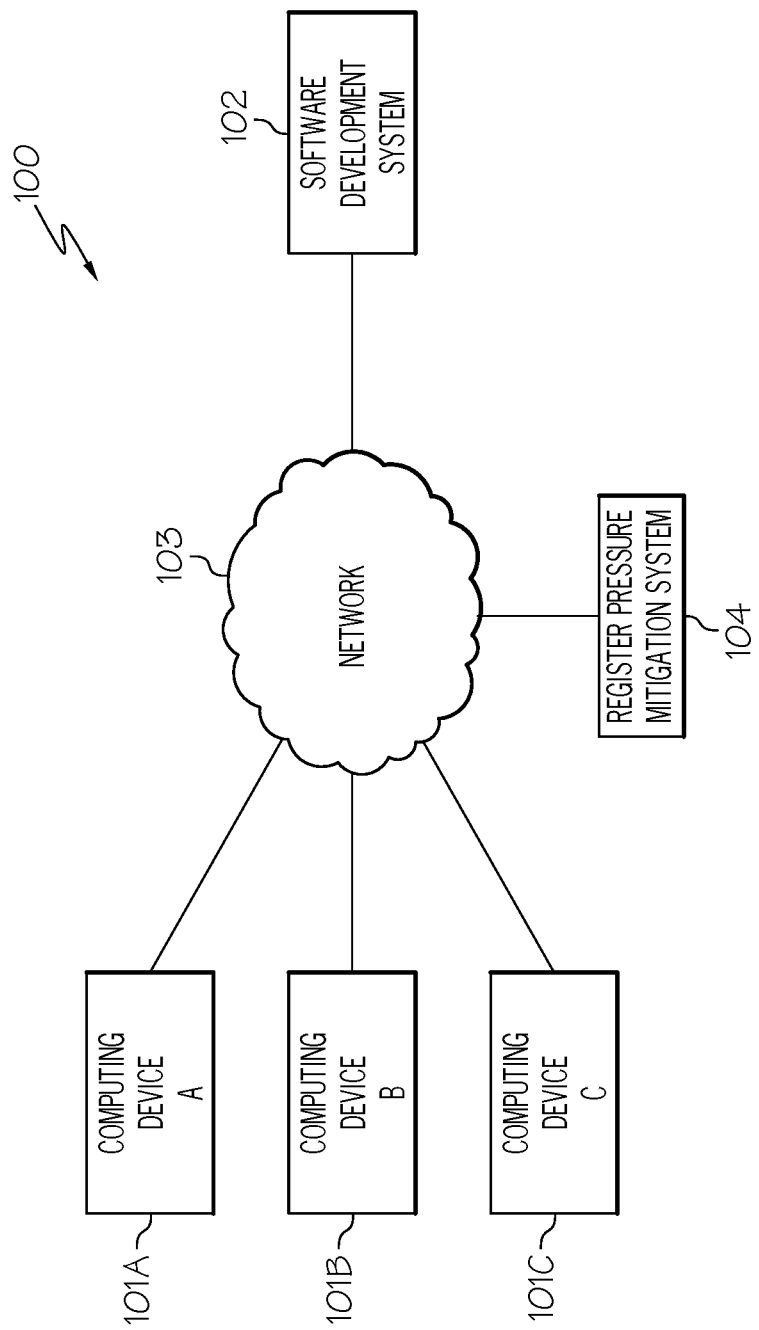
FIG. 1 illustrates a communication system for practicing the principles of the present disclosure in accordance with an embodiment of the present disclosure.

As stated above, if there are not enough registers to hold all the variables, some variables may be moved to and from memory (e.g., RAM). This process is called "spilling" the registers. Accessing memory (e.g., RAM) is significantly slower than accessing registers and so a compiled program runs slower. Therefore, an optimizing compiler aims to assign as many variables to available free registers as possible.

"Register pressure" measures the availability of free registers at any point in time during the program execution. That is, register pressure corresponds to the number of simultaneously live variables at an instruction.

Register pressure is high when a large number of the available registers are in use; thus, the higher the register pressure, the more often the register contents must be spilled into memory. Increasing the number of registers in an architecture decreases register pressure but increases the cost.

Register pressure is especially an issue involving certain applications, such as artificial intelligence and machine learning applications, which utilize an enormous amount of data that is computationally intensive. In such applications, data may involve a large number of variables and computations, which may result in high register pressure, which may result in spills (storing the variables in memory) and reloads (loading stored variables from memory) inside a hot loop (a region of instructions where a large amount of time is spent during the program's execution).

There have been various register allocation algorithms (e.g., greedy register allocation, linear scan register allocation, Partitioned Boolean Quadratic Problem) developed in an attempt to minimize register pressure. Unfortunately, such attempts have failed to adequately reduce register pressure, including in situations involving hot loops.

The embodiments of the present disclosure provide a means for reducing register pressure by changing the address expressions for load/store instructions to reuse common offsets in a loop of a function. In particular, the embodiments of the present disclosure identify chains (ordered set of operations) within a loop of a function that is subject to high register pressure (i.e., the number of live variables exceeds a threshold number, such as the number of available registers). In such chains, the load and store instructions have the same induction address (base address) and the variable offsets of the load and store instructions are loop invariants (values that are not changed at every iteration of the loop). An analysis and transformation is then performed in such chains whereby such chains are divided into smaller chains with different new bases. Among the newly created smaller chains, variable offsets are reused among them to reduce the number of variable offsets to be stored in the registers thereby reducing register pressure. A more detailed description of these and other features will be provided below.

In some embodiments of the present disclosure, the present disclosure comprises a computer-implemented method, system and computer program product for reducing register pressure. In one embodiment of the present disclosure, loops of a computer program (also simply referred to as a "program") with a number of live variables that exceeds a threshold number, such as the number of available registers with capacity to store data, are identified. Such identified loops may be the to be subject to high register pressure, in which the number of live variables exceeds the number of available registers with capacity to store data. Upon identifying such loops in the computer program, chains within each identified loop are identified, where each chain includes load and store instructions from the same induction address and where the variable offsets of the load and store instructions are loop invariants. A "chain," as used herein, refers to an ordered set of operations. An "induction address," as used herein, refers to the base address that is utilized by the variables of the loop. A "base address," as used herein, refers to the address serving as a reference point ("base") for other addresses, such as the addresses for the variables. For example, a variables address may correspond to the base address plus an "offset address." An "offset address," as used herein, refers to the number of address locations added to the base address in order to obtain a specific absolute address. A "loop invariant," as used herein, refers to a condition that is true at the beginning and the end of every iteration of the loop. The address expressions for the load and store instructions in the identified chains may then be modified or changed to reuse common variable offsets using the analysis and transformation process discussed herein. By reusing common variable offsets, there are less variable offsets that need to be stored in the registers thereby mitigating register pressure.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a software development system 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and software development system 102. It is noted that both computing device 101 and the user of computing device 101 may be identified with element number 101.

Software development system 102 is a system utilized, such as by software programmers and software developers (e.g., users of computing devices 101), in the process of creating, designing, deploying and supporting software. Examples of such software development systems, include, but not limited to, RAD Studio®, Embold®, Collaborator®, Studio 3T®, NetBeans®, Zend Studio®, Microsoft® Expression Studio, etc.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 further includes a register pressure mitigation system 104 interconnected with computing devices 101 and software development system 102 via network 103. In one embodiment, register pressure mitigation system 104 is configured to reduce register pressure, such as by modifying the address expressions for load/store instructions to reuse common offsets (variable offsets) in a loop of a function as discussed further below.

A description of the software components of register pressure mitigation system 104 used for reducing register pressure is provided below in connection with FIG. 2. A description of the hardware configuration of register pressure mitigation system 104 is provided further below in connection with FIG. 5.

System 100 is not to be limited in scope to any one particular network architecture. System 100 may include any number of computing devices 101, software development systems 102, networks 103 and register pressure mitigation systems 104.

A discussion regarding the software components used by register pressure mitigation system 104 to reduce register pressure is provided below in connection with FIG. 2.

Figure 2:
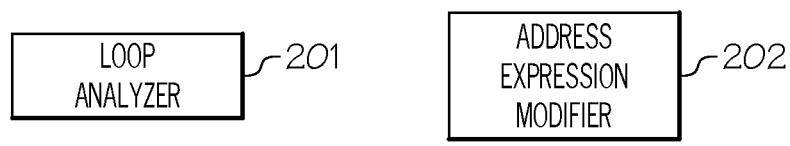
FIG. 2 is a diagram of the software components used by the register pressure mitigation system to reduce register pressure in accordance with an embodiment of the present disclosure.

FIG. 2 is a diagram of the software components used by register pressure mitigation system 104 (FIG. 1) to reduce register pressure in accordance with an embodiment of the present disclosure.

Referring to FIG. 2, in conjunction with FIG. 1, register pressure mitigation system 104 includes a loop analyzer 201 configured to identify loops of a computer program (also simply referred to as a "program") with a number of live variables that exceeds a threshold number, such as the number of available registers with capacity to store data. Such identified loops may be the to be subject to high register pressure, in which the number of live variables exceeds the number of available registers with capacity to store data. In one embodiment, the threshold number corresponds to the number of available registers (e.g., general purpose registers) with available space to store data. In one embodiment, the number of available registers with available space to store data is received by loop analyzer 201 from the memory management function, such as the memory management function of the computing device (e.g., computing device 101A, software development system 102) running the program. In one embodiment, the threshold number is user-designated, such as from an expert.

In one embodiment, loop analyzer 201 identifies loops in a computer program based on keywords, such as "while," "for," "do," etc. In one embodiment, such keywords are populated in a data structure (e.g., table), such as by expert, which informs loop analyzer 201 which terms should be searched in the computer program. In one embodiment, loop analyzer 201 searches for such keywords, which are obtained from the data structure, in a computer program using natural language processing. Upon identifying such terms, loop analyzer 201 searches for break statements or exit functions which are used to break out of the loop. In this manner, loop analyzer 201 identifies the entirety of the loop of the function. In one embodiment, such break statements or exit functions are populated in a data structure (e.g., table), such as by expert, which informs loop analyzer 201 which terms should be searched in the computer program. In one embodiment, loop analyzer 201 searches for such statements or functions, which are obtained from the data structure, in a computer program using natural language processing. In one embodiment, such data structures are stored in a storage device of register pressure mitigation system 104.

In one embodiment, loop analyzer 201 utilizes various software tools for identifying loops in the program, including, but not limited to, Bison, low level virtual machine (LLVM®), etc.

In one embodiment, upon identifying the loops in the computer program, loop analyzer 201 identifies which of these loops contains a number of live variables that exceeds a threshold number, such as the number of available registers. A "live variable", as used herein, refers to a variable with a value that is in use. In one embodiment, loop analyzer 201 determines the number of live variables in a loop based on live variable analysis, involving a data-flow analysis to calculate the variables that are live at each point in the program. A variable may be the to be "live" at some point if it holds a value that may be needed in the future or equivalently if its value may be read before the next time the variable is written to. In one embodiment, loop analyzer 201 performs live variable analysis based on two functions: the variables read and the variables written to. In one embodiment, loop analyzer 201 computes the number of live variables based on a fix point algorithm that uses such functions, which compute variables that are live after the current statement. In one embodiment, loop analyzer 201 performs such liveness analysis using various software tools, including, but not limited to, k-Liveness, LLVM®, etc.

In one embodiment, loop analyzer 201 identifies the chains within each identified loop, where each chain includes load and store instructions from the same induction address and the variable offsets of the load and store instructions are loop invariants. A "chain," as used herein, refers to an ordered set of operations. An "induction address," as used herein, refers to the base address that is utilized by the variables of the loop. A "base address," as used herein, refers to the address serving as a reference point ("base") for other addresses, such as the addresses for the variables. For example, a variables address may correspond to the base address plus an "offset address." An "offset address," as used herein, refers to the number of address locations added to the base address in order to obtain a specific absolute address. A "loop invariant," as used herein, refers to a condition that is true at the beginning and the end of every iteration of the loop. In one embodiment, loop analyzer 201 utilizes various software tools (e.g., scalar evolution analysis in LLVM®) for identifying load/store instructions (e.g., load/store instructions that have the same base address) which can be put into the same chain. An illustration of a chain of a loop, where the load and store instructions are from the same induction address and the variable offsets of the load and store instructions are loop invariants, is shown in FIG. 3.

FIG. 3 is pseudocode illustrating a chain within a loop, where the load and store instructions are from the same induction address and the variable offsets of the load and store instructions are loop invariants, in accordance with an embodiment of the present disclosure.

Referring to FIG. 3, pseudocode 300 includes a chain of a loop 301, where the base 302 is an induction address, the offsets (M*N variable offsets) 303 are the loop invariants, and the values 304 are all used inside loop 301. Furthermore, as shown in FIG. 3, the live variables ("liveins") 305 correspond to the variable offsets shown in FIG. 3. As a result, the number of liveins 305 in loop 301 is M*N. If such a number of liveins is approaching or larger than the number of general-purpose registers, then spilling may occur which degrades performance.

As a result, in one embodiment, address expression modifier 202 of register pressure mitigation system 104 addresses such potential spilling by modifying the address expressions for load and store instructions in the identified chains to reuse common variable offsets. In one embodiment, address expression modifier 202 performs an analysis and transformation in the identified chains in which such chains are divided into smaller chains with different new bases. Among the newly created smaller chains, variable offsets are reused among them to reduce the number of variable offsets to be stored in the registers thereby reducing register pressure as shown in FIG. 4.

FIG. 4 is pseudocode illustrating the generation of M smaller chains among a chain of loop 301 (FIG. 3) whereby N variable offsets are reused among the M smaller chains in accordance with an embodiment of the present disclosure.

Referring to FIG. 4, pseudocode 400 includes a first smaller chain 401A with a new base (base+base1), a second smaller chain 401B with a new base (base+base2) and an M smaller chain 401M with a new base (base+baseM) that were generated among the chain of loop 301 of FIG. 3, where M may be any positive integer number. Smaller chains 401A-401M may collectively or individually be referred to as smaller chains 401 or smaller chain 401, respectively. While FIG. 4 illustrates generating a particular number of smaller chains 401 among the main chain of loop 301, any number of smaller chains 401 may be generated using the analysis and transformation process discussed further below.

Furthermore, as shown in FIG. 4, N variable offsets (e.g., offset1, offset2 . . . offsetN) are reused among the smaller chains 401. Consequently, the address expressions for the load and store instructions in the smaller chains 401 are modified to reuse such common variable offsets (e.g., offset1, offset2 . . . offsetN) as shown in FIG. 4. As a result, the number of the "liveins" 305 of the loop is reduced from M*N to M+N which reduces the number of spills and reloads, including in a hot loop, thereby reducing register pressure. In one embodiment, for M+N, M is for hoisted (base+base1 . . . M) while N is for hoisted (offset1 . . . N).

A discussion regarding the analysis and transformation process, which involves dividing the chains identified by loop analyzer 201 into smaller chains (e.g., smaller chains 401) with different new bases whereby variable offsets are reused among the smaller chains, is provided below in connection with FIGS. 6 and 7A-7B.

A further description of these and other features is provided below in connection with the discussion of the method for reducing register pressure.

Prior to the discussion of the method for reducing register pressure, a description of the hardware configuration of register pressure mitigation system 104 (FIG. 1) is provided below in connection with FIG. 5.

Figure 5:
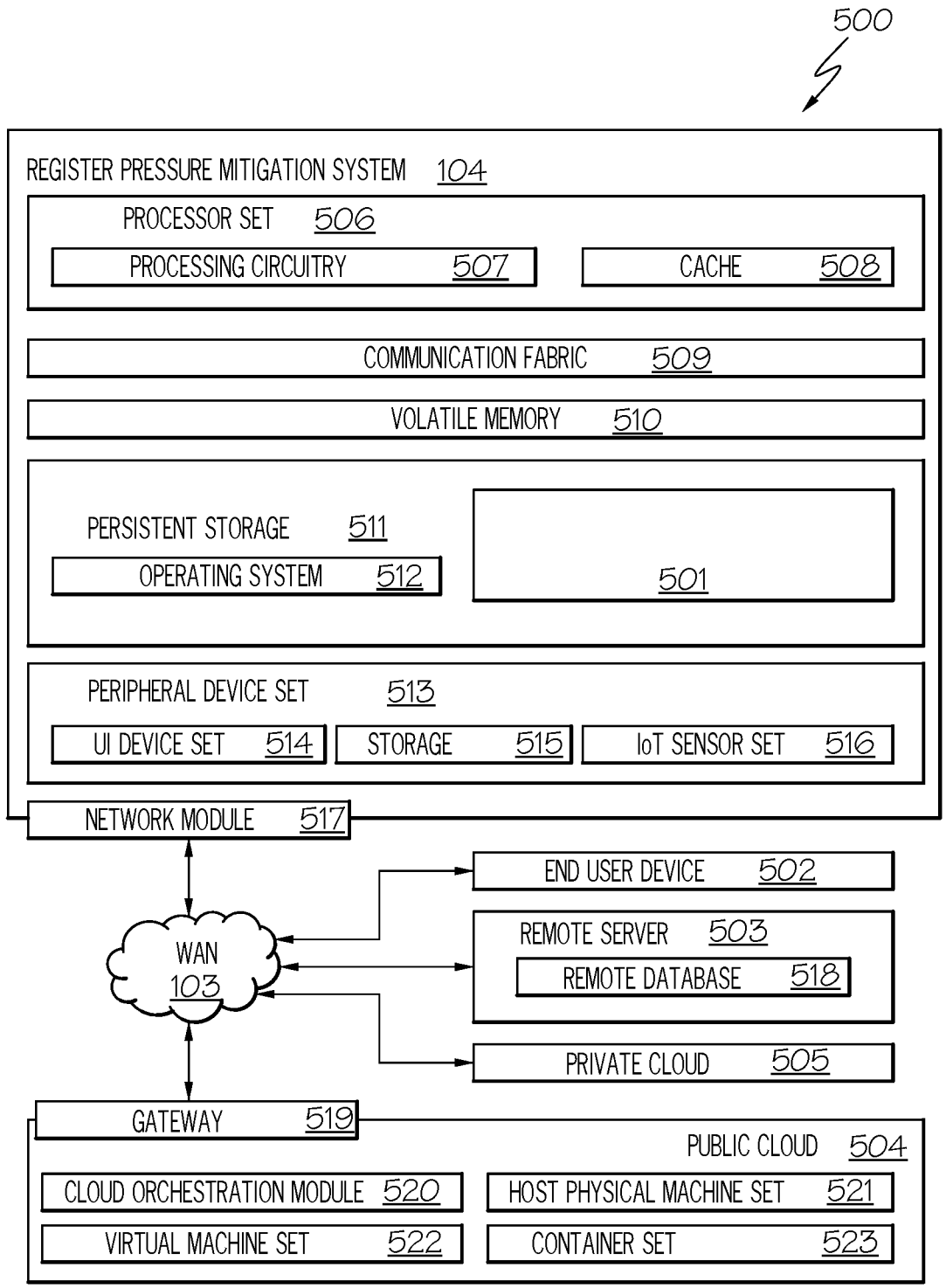
FIG. 5 illustrates an embodiment of the present disclosure of the hardware configuration of the register pressure mitigation system which is representative of a hardware environment for practicing the present disclosure.

Referring now to FIG. 5, in conjunction with FIG. 1, FIG. 5 illustrates an embodiment of the present disclosure of the hardware configuration of register pressure mitigation system 104 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as reducing register pressure. In addition to block 501, computing environment 500 includes, for example, register pressure mitigation system 104, network 103, such as a wide area network (WAN), end user device (EUD) 502, remote server 503, public cloud 504, and private cloud 505. In this embodiment, register pressure mitigation system 104 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Register pressure mitigation system 104 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically register pressure mitigation system 104, to keep the presentation as simple as possible. Register pressure mitigation system 104 may be located in a cloud, even though it is not shown in a cloud in FIG. 5. On the other hand, register pressure mitigation system 104 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto register pressure mitigation system 104 to cause a series of operational steps to be performed by processor set 506 of register pressure mitigation system 104 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 508 and the other storage media discussed below. The program instructions, and associated data, are accessed by processor set 506 to control and direct performance of the inventive methods. In computing environment 500, at least some of the instructions for performing the inventive methods may be stored in block 501 in persistent storage 511.

Communication fabric 509 is the signal conduction paths that allow the various components of register pressure mitigation system 104 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In register pressure mitigation system 104, the volatile memory 510 is located in a single package and is internal to register pressure mitigation system 104, but, alternatively or additionally, the volatile memory may be distributed over multiple packages and/or located externally with respect to register pressure mitigation system 104.

Persistent Storage 511 is any form of non-volatile storage for computers that is now known or to be developed in the future. The non-volatility of this storage means that the stored data is maintained regardless of whether power is being supplied to register pressure mitigation system 104 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the inventive methods.

Peripheral device set 513 includes the set of peripheral devices of register pressure mitigation system 104. Data communication connections between the peripheral devices and the other components of register pressure mitigation system 104 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where register pressure mitigation system 104 is required to have a large amount of storage (for example, where register pressure mitigation system 104 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows register pressure mitigation system 104 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the inventive methods can typically be downloaded to register pressure mitigation system 104 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates register pressure mitigation system 104), and may take any of the forms discussed above in connection with register pressure mitigation system 104. EUD 502 typically receives helpful and useful data from the operations of register pressure mitigation system 104. For example, in a hypothetical case where register pressure mitigation system 104 is designed to provide a recommendation to an end user, this recommendation would typically be communicated from network module 517 of register pressure mitigation system 104 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to register pressure mitigation system 104. Remote server 503 may be controlled and used by the same entity that operates register pressure mitigation system 104. Remote server 503 represents the machine(s) that collect and store helpful and useful data for use by other computers, such as register pressure mitigation system 104. For example, in a hypothetical case where register pressure mitigation system 104 is designed and programmed to provide a recommendation based on historical data, then this historical data may be provided to register pressure mitigation system 104 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to reduce register pressure. In one embodiment, such components may be implemented in hardware. The functions discussed above performed by such components are not generic computer functions. As a result, register pressure mitigation system 104 is a particular machine that is the result of implementing specific, non-generic computer functions.

In one embodiment, the functionality of such software components of register pressure mitigation system 104, including the functionality for reducing register pressure may be embodied in an application specific integrated circuit.

As stated above, if there are not enough registers to hold all the variables, some variables may be moved to and from memory (e.g., RAM). This process is called "spilling" the registers. Accessing memory (e.g., RAM) is significantly slower than accessing registers and so a compiled program runs slower. Therefore, an optimizing compiler aims to assign as many variables to available free registers as possible. "Register pressure" measures the availability of free registers at any point in time during the program execution. That is, register pressure corresponds to the number of simultaneously live variables at an instruction. Register pressure is high when a large number of the available registers are in use; thus, the higher the register pressure, the more often the register contents must be spilled into memory. Increasing the number of registers in an architecture decreases register pressure but increases the cost. Register pressure is especially an issue involving certain applications, such as artificial intelligence and machine learning applications, which utilize an enormous amount of data that is computationally intensive. In such applications, data may involve a large number of variables and computations, which may result in high register pressure, which may result in spills (storing the variables in memory) and reloads (loading stored variables from memory) inside a hot loop (a region of instructions where a large amount of time is spent during the program's execution). There have been various register allocation algorithms (e.g., greedy register allocation, linear scan register allocation, Partitioned Boolean Quadratic Problem) developed in an attempt to minimize register pressure. Unfortunately, such attempts have failed to adequately reduce register pressure, including in situations involving hot loops.

The embodiments of the present disclosure provide a means for reducing register pressure by changing the address expressions for load/store instructions to reuse common offsets in a loop of a function as discussed below in connection with FIGS. 6 and 7A-7B. FIG. 6 is a flowchart of a method for reducing register pressure. FIGS. 7A-7B are a flowchart of a method for performing the analysis and transformation to reuse variable offsets among smaller chains within a larger chain of the loop of a function. FIG. 8 illustrates code involving a chain of a loop of a function.

Figure 6:
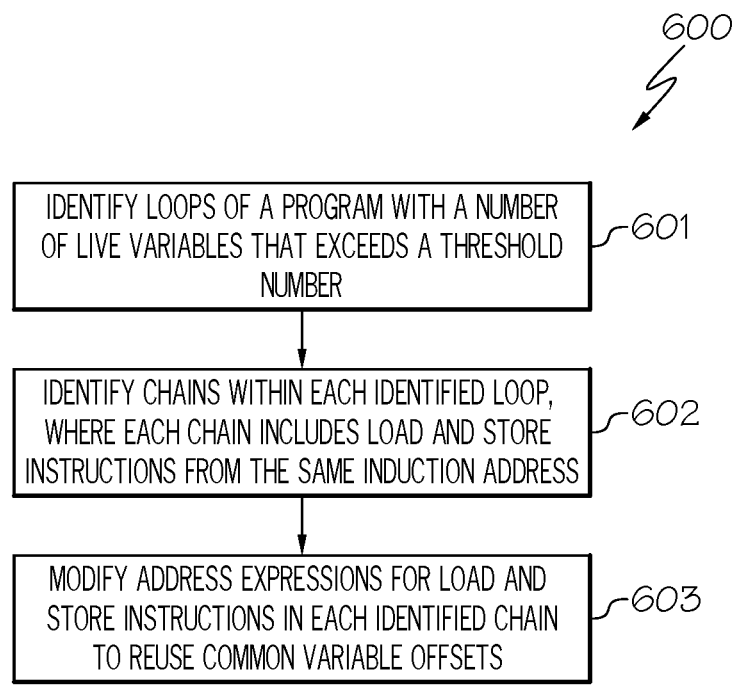
FIG. 6 is a flowchart of a method for reducing register pressure in accordance with an embodiment of the present disclosure.

As stated above, FIG. 6 is a flowchart of a method 600 for reducing register pressure in accordance with an embodiment of the present disclosure.

Referring to FIG. 6, in conjunction with FIGS. 1-5, in operation 601, loop analyzer 201 of register pressure mitigation system 104 identifies loops of a computer program (also simply referred to as a "program") with a number of live variables that exceeds a threshold number, such as the number of available registers with capacity to store data. Such identified loops may be the to be subject to high register pressure, in which the number of live variables exceeds the number of available registers with capacity to store data. In one embodiment, the threshold number corresponds to the number of available registers (e.g., general purpose registers) with available space to store data. In one embodiment, the number of available registers with available space to store data is received by loop analyzer 201 from the memory management function, such as the memory management function of the computing device (e.g., computing device 101A, software development system 102) running the program. In one embodiment, the threshold number is user-designated, such as from an expert.

As discussed above, in one embodiment, loop analyzer 201 identifies loops in a computer program based on keywords, such as "while," "for," "do," etc. In one embodiment, such keywords are populated in a data structure (e.g., table), such as by expert, which informs loop analyzer 201 which terms should be searched in the computer program. In one embodiment, loop analyzer 201 searches for such keywords, which are obtained from the data structure, in a computer program using natural language processing. Upon identifying such terms, loop analyzer 201 searches for break statements or exit functions which are used to break out of the loop. In this manner, loop analyzer 201 identifies the entirety of the loop of the function. In one embodiment, such break statements or exit functions are populated in a data structure (e.g., table), such as by expert, which informs loop analyzer 201 which terms should be searched in the computer program. In one embodiment, loop analyzer 201 searches for such statements or functions, which are obtained from the data structure, in a computer program using natural language processing. In one embodiment, such data structures are stored in a storage device (e.g., storage device 511, 515) of register pressure mitigation system 104.

In one embodiment, loop analyzer 201 utilizes various software tools for identifying loops in the program, including, but not limited to, Bison, low level virtual machine (LLVM®), etc.

Upon identifying the loops in the computer program, loop analyzer 201 of register pressure mitigation system 104 identifies which of these loops contains a number of live variables that exceeds a threshold number, such as the number of available registers.

As stated above, a "live variable," as used herein, refers to a variable with a value that is in use. In one embodiment, loop analyzer 201 determines the number of live variables in a loop based on live variable analysis, involving a data-flow analysis to calculate the variables that are live at each point in the program. A variable may be the to be "live" at some point if it holds a value that may be needed in the future or equivalently if its value may be read before the next time the variable is written to. In one embodiment, loop analyzer 201 performs live variable analysis based on two functions: the variables read and the variables written to. In one embodiment, loop analyzer 201 computes the number of live variables based on a fix point algorithm that uses such functions, which compute variables that are live after the current statement. In one embodiment, loop analyzer 201 performs such liveness analysis using various software tools, including, but not limited to, k-Liveness, LLVM®, etc.

In operation 602, loop analyzer 201 of register pressure mitigation system 104 identifies the chains within each identified loop, where each chain includes load and store instructions from the same induction address and the variable offsets of the load and store instructions are loop invariants. A "chain," as used herein, refers to an ordered set of operations. An "induction address," as used herein, refers to the base address that is utilized by the variables of the loop. A "base address," as used herein, refers to the address serving as a reference point ("base") for other addresses, such as the addresses for the variables. For example, a variables address may correspond to the base address plus an "offset address." An "offset address," as used herein, refers to the number of address locations added to the base address in order to obtain a specific absolute address. A "loop invariant," as used herein, refers to a condition that is true at the beginning and the end of every iteration of the loop. In one embodiment, loop analyzer 201 utilizes various software tools (e.g., scalar evolution analysis in LLVM®) for identifying load/store instructions (e.g., load/store instructions that have the same base address) which can be put into the same chain. An illustration of a chain of a loop, where the load and store instructions are from the same induction address and the variable offsets of the load and store instructions are loop invariants is shown in FIG. 3.

Referring to FIG. 3, pseudocode 300 includes a chain of a loop 301, where the base 302 is an induction address, the offsets (M*N variable offsets) 303 are the loop invariants, and the values 304 are all used inside loop 301. Furthermore, as shown in FIG. 3, the live variables ("liveins") 305 correspond to the variable offsets shown in FIG. 3. As a result, the number of liveins 305 in loop 301 is M*N. If such a number of liveins is approaching or larger than the number of general-purpose registers, then spilling may occur which degrades performance. Such spilling is addressed by address expression modifier 202 as discussed herein.

In operation 603, address expression modifier 202 of register pressure mitigation system 104 modifies the address expressions for the load and store instructions in the identified chains to reuse common variable offsets.

As discussed above, in one embodiment, address expression modifier 202 performs an analysis and transformation in the identified chains in which such chains are divided into smaller chains with different new bases. Among the newly created smaller chains, variable offsets are reused among them to reduce the number of variable offsets to be stored in the registers thereby reducing register pressure as shown in FIG. 4.

Referring to FIG. 4, pseudocode 400 includes a first smaller chain 401A with a new base (base+base1), a second smaller chain 401B with a new base (base+base2) . . . and an M smaller chain 401M with a new base (base+baseM) that were generated among the chain of loop 301 of FIG. 3.

Furthermore, as shown in FIG. 4, N variable offsets (e.g., offset1, offset2 . . . offsetN) are reused among the smaller chains 401. Consequently, the address expressions for the load and store instructions in the smaller chains 401 are modified to reuse such common variable offsets (e.g., offset1, offset2 . . . offsetN) as shown in FIG. 4. As a result, the number of the "liveins" 305 of the loop is reduced from M*N to M+N which reduces the number of spills and reloads, including in a hot loop, thereby reducing register pressure. In one embodiment, for M+N, M is for hoisted (base+base1 . . . M) while N is for hoisted (offset1 . . . N).

A discussion regarding the analysis and transformation process, which involves dividing the chains identified by loop analyzer 201 into smaller chains (e.g., smaller chains 401) with different new bases, whereby variable offsets are reused among the smaller chains, is provided below in connection 7A-7B. FIGS. 7A-7B illustrate an exemplary embodiment using the principles of the present disclosure for addressing an algorithm problem, namely, addressing the problem of when there are N addresses based on one base induction address, and determining how many offsets and new base addresses are needed to represent all of these N addresses.

Figure 7A:
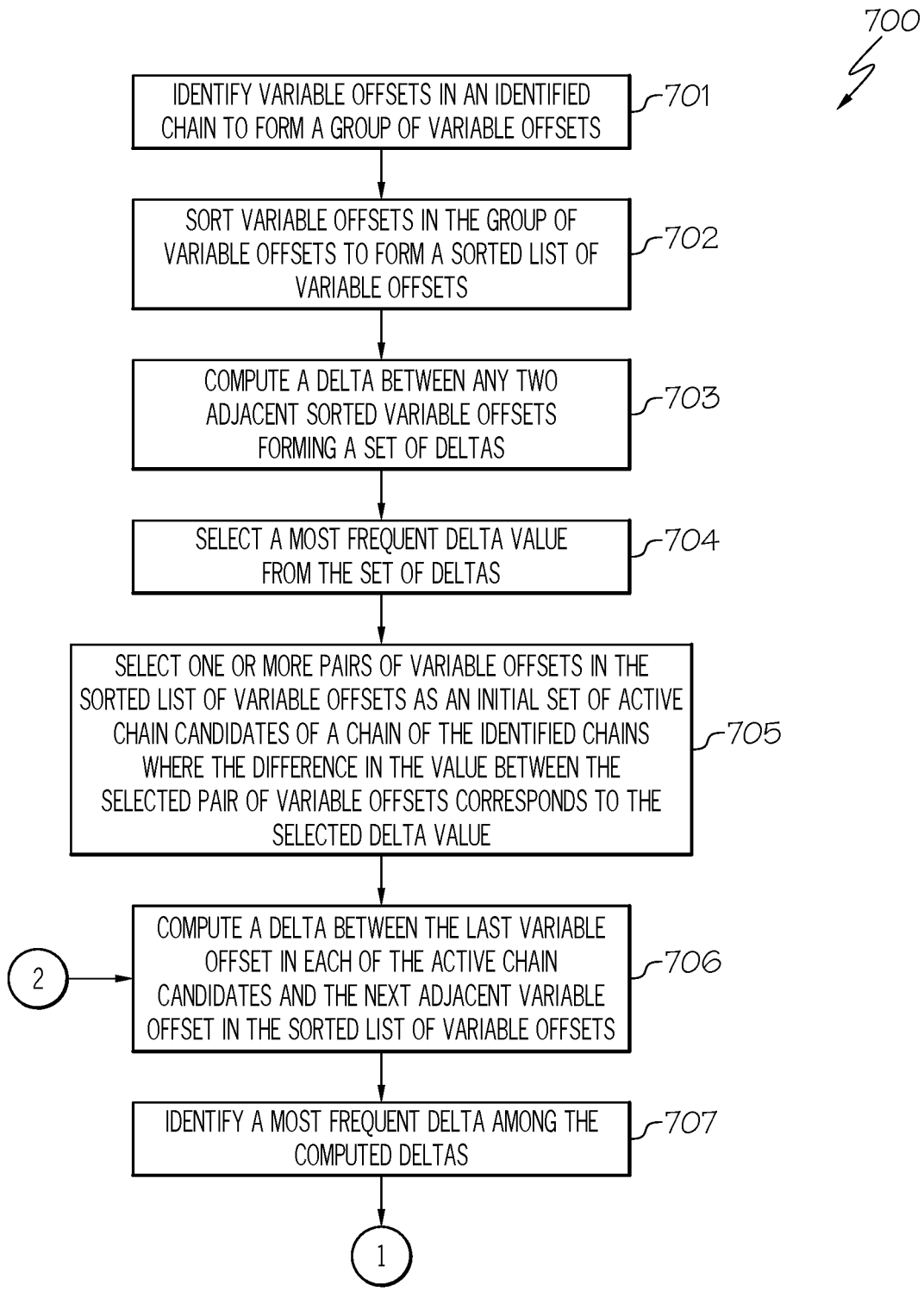
FIGS. 7A-7B are a flowchart of a method for performing the analysis and transformation to reuse variable offsets among smaller chains within a larger chain of the loop of a function in accordance with an embodiment of the present disclosure.
Figure 7B:
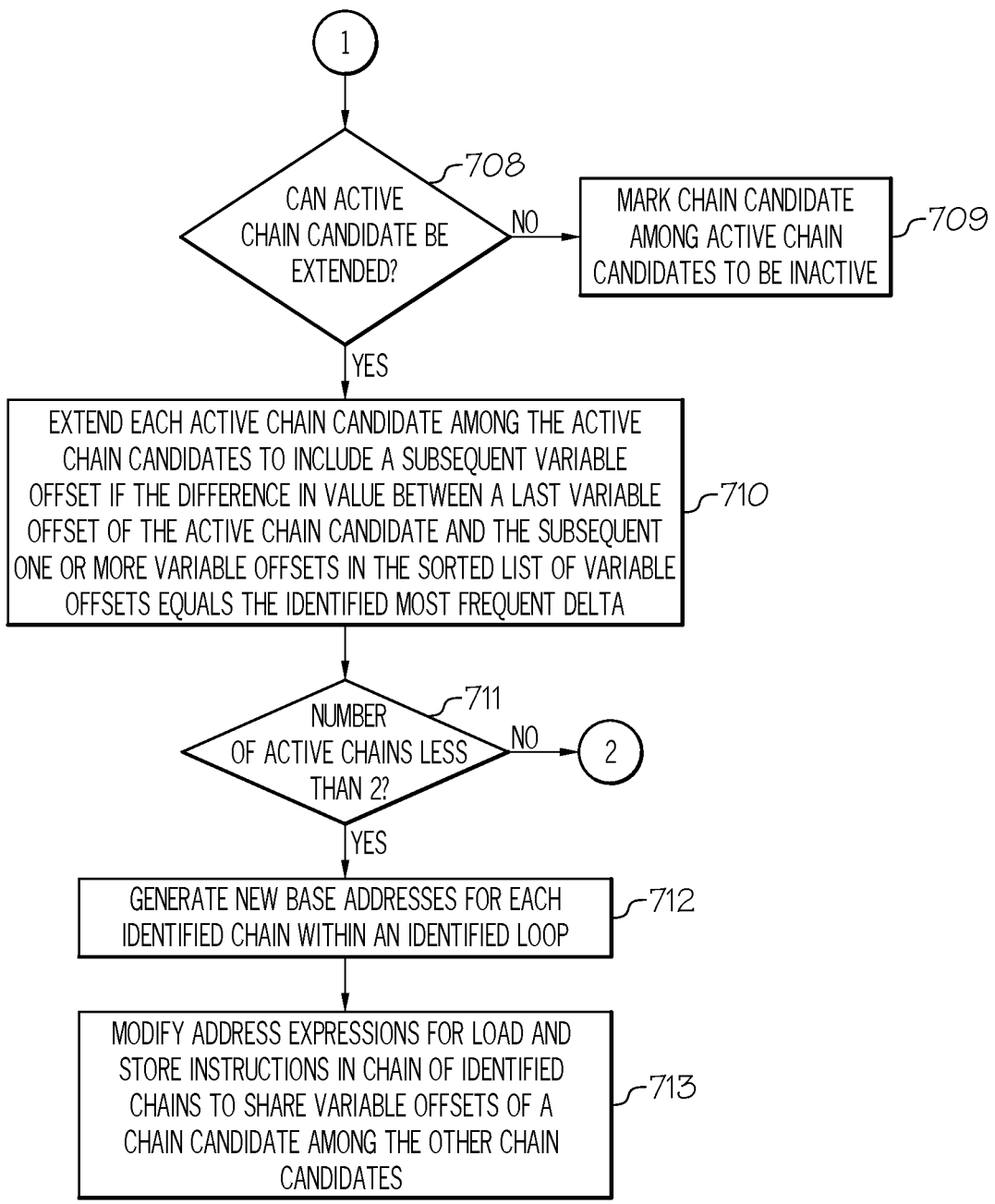

FIGS. 7A-7B are a flowchart of a method 700 for performing the analysis and transformation to reuse variable offsets among smaller chains within a larger chain of the loop of a function in accordance with an embodiment of the present disclosure.

Referring to FIG. 7A, in conjunction with FIGS. 1-6, in operation 701, address expression modifier 202 of register pressure mitigation system 104 identifies the variable offsets in an identified chain (identified in operation 602) to form a group of variable offsets as shown in FIG. 8.

FIG. 8 illustrates code 800 involving a chain 801 of a loop of a function, such as a chain identified by loop analyzer 201 in operation 602, in accordance with an embodiment of the present disclosure.

Referring to FIG. 8, chain 801 includes variable offsets of the load and store instructions that are loop invariants, which are identified in chain 801 as v1, v2, v5, v10, v21, v22, v25, v30, v41, v42, v43, v45, v61, v62, v65, v70, etc. Hence, the loop invariant offset set is offset*1, offset*2, offset*5, offset*10, offset*21, offset*22, offset*25, offset*30, offset*41, offset*42, offset*43, offset*45, offset*61, offset*62, offset*65, offset*70, etc.

In one embodiment, such variant offsets are identified in chain 801 by address expression modifier 202 by identifying keywords, such as "#define . . . offset*x," in chain 801. In one embodiment, such keywords are identified in chain 801 by address expression modifier 202 using natural language processing. In one embodiment, such keywords are obtained from a data structure (e.g., table) stored in a storage device (e.g., storage device 511, 515) of register pressure mitigation system 104. In one embodiment, such a data structure containing such keywords is populated by an expert.

In one embodiment, address expression modifier 202 utilizes various software tools to identify the variant offsets in the chain (e.g., chain 801) identified by loop analyzer 201 in operation 602, including, but not limited to, SonarQube®, Synopsis® Coverity, Snyk® Code, etc.

Returning to FIG. 7A, in conjunction with FIGS. 1-6 and 8, in operation 702, address expression modifier 202 of register pressure mitigation system 104 sorts the variables offsets (identified in operation 701) in the group of variable offsets to form a sorted list of variable offsets.

In one embodiment, address expression modifier 202 separates the variables from the variable offsets. In one embodiment, the variable offsets are simplified into constants. In one embodiment, duplicate constants are filtered out. For example, the variable offsets of "off, off*2, off*3, off*5, off*7, off*3, . . . " would form a list of 1, 2, 3, 5, 7, . . . For instance, referring to FIG. 8, the sorted list of variable offsets would correspond to the list of "1, 2, 5, 10, 21, 22, 25, 30, 41, 42, 43, 45, 61, 62, 65, 70."

In one embodiment, address expression modifier 202 utilizes various software tools to sort the variables offsets (identified in operation 701) in the group of variable offsets to form a sorted list of variable offsets as discussed above, including, but not limited to, Matlab®, IBM® SPSS Statistics, Sisense®, Minitab®, etc.

In operation 703, address expression modifier 202 of register pressure mitigation system 104 computes a delta (difference in value) between any two adjacent sorted variable offsets forming a set of deltas. For example, as discussed above, the sorted list of variable offsets would correspond to the list of "1, 2, 5, 10, 21, 22, 25, 30, 41, 42, 43, 45, 61, 62, 65, 70." The delta between the values of 1 and 2 is 1. The delta between the values of 2 and 5 is 3. The delta between the values of 5 and 10 is 5. The delta between the values of 10 and 21 is 11. The delta between the values of 21 and 22 is 1. The delta between the values of 22 and 25 is 3. The delta between the values of 25 and 30 is 5. The delta between the values of 30 and 41 is 11. The delta between the values of 41 and 42 is 1. The delta between the values of 42 and 43 is 1. The delta between the values of 43 and 45 is 2. The delta between the values of 45 and 61 is 16. The delta between the values of 61 and 62 is 1. The delta between the values of 62 and 65 is 3. The delta between the values of 65 and 70 is 5. Hence, the computed deltas correspond to the set of "1, 3, 5, 11, 1, 3, 5, 11, 1, 1, 2, 16, 1, 3, 5."

In one embodiment, address expression modifier 202 utilizes various software tools to compute the delta between any two adjacent sorted variable offsets as discussed above, including, but not limited to, Matlab®, IBM® SPSS Statistics, Sisense®, Minitab®, etc.

In operation 704, address expression modifier 202 of register pressure mitigation system 104 selects the most frequent delta value from the set of deltas.

Referring to the example discussed above, the most frequent delta value in the set of "1, 3, 5, 11, 1, 3, 5, 11, 1, 1, 2, 16, 1, 3, 5" corresponds to the value of 1.

In one embodiment, address expression modifier 202 utilizes various software tools to select the most frequent delta value as discussed above, including, but not limited to, Matlab®, IBM® SPSS Statistics, Sisense®, Minitab®, etc.

In operation 705, address expression modifier 202 of register pressure mitigation system 104 selects one or more pairs of variable offsets in the sorted list of variable offsets as an initial set of active chain candidates (e.g., smaller chains 401) of a chain (e.g., chain 801) of the identified chains (chains identified in operation 602) where the difference in the value between the selected pair of variable offsets corresponds to the selected delta value.

For example, referring to the example discussed above, the sorted list of variable offsets includes the set of "1, 2, 5, 10, 21, 22, 25, 30, 41, 42, 43, 45, 61, 62, 65, 70." As a result, the initial set of active chain candidates would correspond to the set of: active chain A (1→2), active chain B (21→22), active chain C (41→42) and active chain D (61→62), where each of the selected pairs of variable offsets in the sorted list of variable offsets has a difference in value corresponding to the selected delta value (value of 1).

In one embodiment, address expression modifier 202 utilizes various software tools to perform such a selection, including, but not limited to, Matlab®, IBM® SPSS Statistics, Sisense®, Minitab®, etc.

In operation 706, address expression modifier 202 of register pressure mitigation system 104 computes a delta between the last variable offset in each of the active chain candidates and the next adjacent variable offset in the sorted list of variable offsets.

For example, referring to the example discussed above, the last variable offset in each of the active chain candidates (active chains A, B, C and D) corresponds to the values of 2, 22, 42 and 62. The next adjacent variable offsets in the sorted list of variable offsets to such values corresponds to the values of 5, 25, 43 and 65, respectively. As a result, the delta between the values of 2→5 is 3; the delta between the values of 22→25 is 3; the delta between the values of 42→43 is 1; and the delta between the values of 62→65 is 3.

In one embodiment, address expression modifier 202 utilizes various software tools to compute the delta between the last variable offset in each of the active chain candidates and the next adjacent variable offset in the sorted list of variable offsets as discussed above, including, but not limited to, Matlab®, IBM® SPSS Statistics, Sisense®, Minitab®, etc.

In operation 707, address expression modifier 202 of register pressure mitigation system 104 identifies the most frequent delta among the computed deltas.

For instance, referring to the example discussed above, the computed deltas correspond to the set of deltas of "3, 3, 1 and 3." As a result, the most frequent delta among the computed deltas corresponds to the value of 3.

In one embodiment, address expression modifier 202 utilizes various software tools to compute the most frequent delta among the computed deltas as discussed above, including, but not limited to, Matlab®, IBM® SPSS Statistics, Sisense®, Minitab®, etc.

Referring now to FIG. 7B, in conjunction with FIGS. 1-6 and 8, in operation 708, address expression modifier 202 of register pressure mitigation system 104 determines whether an active chain candidate (e.g., chain candidates A, B, C and D) can be extended.

"Extension" of an active chain candidate, as used herein, refers to being able to enlarge or increase the list of variable offsets that are associated with the active chain candidate.

For instance, referring to the example discussed above, active chain candidate A currently has the list of the following variable offsets: (1→2). Active chain candidate B currently has the list of the following variable offsets: (21→22). Active chain candidate C currently has the list of the following variable offsets: (41→42). Active chain candidate D currently has the list of the following variable offsets: (61→62). Address expression modifier 202 then determines whether each of these lists of variable offsets can be extended by determining if the next one or more adjacent numbers in the sorted list of variable offsets is greater than the last number in the list of variable offsets associated with the active chain candidate by the identified most frequent delta (e.g., value of 3). That is, address expression modifier 202 determines whether the difference in value between the last variable offset of the active chain candidate and the subsequent one or more variable offsets in the sorted list of variable offsets equals the identified most frequent delta (identified in operation 707).

For instance, referring to the example discussed above, the last variable offset for active chain candidate A is 2. The subsequent variable offset in the sorted list of variable offsets is 5, which results in a delta of 3 (5-2), which corresponds to the identified most frequent delta. Hence, active chain candidate A can be extended to have the following list of variable offsets: (1→2→5).

In another example, the last variable offset for active chain candidate B is 22. The subsequent variable offset in the sorted list of variable offsets is 25, which results in a delta of 3 (25-22), which corresponds to the identified most frequent delta (delta value of 3). Hence, active chain candidate B can be extended to have the following list of variable offsets: (21→22→25).

In a further example, the last variable offset for active chain candidate C is 42. The subsequent variable offset in the sorted list of variable offsets is 43, which results in a delta of 1 (43-42), which does not correspond to the identified most frequent delta (delta value of 3). However, the following variable offset listed in the sorted list of variable offsets is 45, which results in a delta of 3 (45-42), which corresponds to the identified most frequent delta (delta value of 3). Hence, active chain candidate C can be extended to have the following list of variable offsets: (41→42→45).

In another example, the last variable offset for active chain candidate D is 62. The subsequent variable offset in the sorted list of variable offsets is 65, which results in a delta of 3 (65-62), which corresponds to the identified most frequent delta (delta value of 3). Hence, active chain candidate D can be extended to have the following list of variable offsets: (61→62→65).

In one embodiment, address expression modifier 202 utilizes various software tools to perform such an analysis and transformation (e.g., extending the list of variable offsets of the active chain candidates) as discussed above, including, but not limited to, Matlab®, IBM® SPSS Statistics, Sisense®, Minitab®, etc.

Referring again to operation 708, if an active chain candidate cannot be extended, then, in operation 709, address expression modifier 202 of register pressure mitigation system 104 marks the chain candidate among the active chain candidates to be inactive. For instance, as discussed further below, chain candidate C will be marked inactive during the next iteration of operations 706-711 since chain candidate C will not be able to be extended during the next iteration of operations 706-711. As a result, the remaining active chain candidates are chain candidates A, B and D. That is, those chain candidates (e.g., chain candidate C) that were marked inactive are removed from the set of active chain candidates.

If, however, an active chain candidate (e.g., chain candidates A, B, C and D) can be extended (difference in value between the last variable offset of the active chain candidate and the one or more subsequent variable offsets in the sorted list of variable offsets equals the identified most frequent delta), then, in operation 710, address expression modifier 202 of register pressure mitigation system 104 extends each active chain (e.g., chain candidates A, B, C and D) among the active chain candidates to include a subsequent variable offset as discussed above.

In operation 711, address expression modifier 202 of register pressure mitigation system 104 determines whether the number of remaining active chain candidates in the set of active chain candidates after removing those chain candidates that were marked inactive from the set of active chain candidates is less than 2.

If the number of remaining active chain candidates in the set of active chain candidates is not less than 2, then address expression modifier 202 of register pressure mitigation system 104 computes a delta between the last variable offset in each of the remaining active chain candidates in the set of active chain candidates and the next one or more adjacent variable offsets in the sorted list of variable offsets in operation 706.

For instance, referring to the example discussed above, chain candidates A (1→2→5), B (21→22→25), C (41→42+45) and D (61→62→65) remain active. As a result, the process discussed above in operations 706-711 will be repeated. When such operations are repeated, active chain candidate C cannot be extended. As a result, chain candidate C is marked as being inactive and set of active chain candidates corresponds to chain candidates A, B and D.

For instance, address expression modifier 202 of register pressure mitigation system 104 computes a delta between the last variable offset in each of the active chain candidates and the next adjacent variable offset in the sorted list of variable offsets.

Referring to the example discussed above, the last variable offset in each of the active chain candidates (chain candidates A, B, C and D) corresponds to the values of 5, 25, 45 and 65. The next adjacent variable offsets in the sorted list of variable offsets (1, 2, 5, 10, 21, 22, 25, 30, 41, 42, 43, 45, 61, 62, 65, 70) to such values corresponds to the values of 10, 30, 61 and 70, respectively. As a result, the delta between the values of 5→10 is 5; the delta between the values of 25→30 is 5; the delta between the values of 45→61 is 16; and the delta between the values of 65→70 is 5. As a result, the most frequent delta among the computed deltas corresponds to the value of 5.

Address expression modifier 202 of register pressure mitigation system 104 then determines whether an active chain candidate (e.g., chain candidates A, B, C and D) can be extended.

For instance, referring to the example discussed above, active chain candidate A currently has the following list of variable offsets: (1→2→5). Active chain candidate B currently has the following list of variable offsets: (21→22→25). Active chain candidate C currently has the following list of variable offsets: (41→42→45). Active chain candidate D currently has the following list of variable offsets: (61→62→65). Address expression modifier 202 then determines whether each of these lists of variable offsets can be extended by determining if the next one or more adjacent numbers in the sorted list of variable offsets is greater than the last number in the list of variable offsets associated with the active chain candidate by the identified most frequent delta (e.g., value of 5). That is, address expression modifier 202 determines whether the difference in value between the last variable offset of the active chain candidate and the subsequent one or more variable offsets in the sorted list of variable offsets equals the identified most frequent delta (identified in operation 707).

For example, referring to the example discussed above, the last variable offset for active chain candidate A is 5. The subsequent variable offset in the sorted list of variable offsets is 10, which results in a delta of 5 (10-25), which corresponds to the identified most frequent delta. Hence, active chain candidate A can be extended to have the following list of variable offsets: (1→2→5→10).

In another example, the last variable offset for active chain candidate B is 25. The subsequent variable offset in the sorted list of variable offsets is 30, which results in a delta of 5 (30-25), which corresponds to the identified most frequent delta (delta value of 5). Hence, active chain candidate B can be extended to have the following list of variable offsets: (21→22→25→30).

In a further example, the last variable offset for active chain candidate C is 45. The subsequent variable offset in the sorted list of variable offsets is 61, which results in a delta of 16 (61-45), which does not correspond to the identified most frequent delta (delta value of 5). Hence, chain candidate C cannot be extended and is marked inactive from the set of active chain candidates. Furthermore, in one embodiment, if the next subsequent variable offset in the sorted list of variable offsets is already included in the list of variable offsets for a chain candidate, then the evaluated chain candidate is to be marked inactive. For example, as discussed above, the subsequent variable offset in the sorted list of variable offsets is 61 when evaluating chain candidate C. Since 61 is already included in chain candidate D, chain candidate C is marked inactive.

In another example, the last variable offset for active chain candidate D is 65. The subsequent variable offset in the sorted list of variable offsets is 70, which results in a delta of 5 (70-65), which corresponds to the identified most frequent delta (delta value of 5). Hence, active chain candidate D can be extended to have the following list of variable offsets: (61→62→65→70).

As a result of performing operations 706-710 a subsequent time, the set of active chain candidates corresponds to chain candidates A, B and D since chain candidate C was marked inactive.

As previously discussed, in operation 711, address expression modifier 202 determines whether the number of remaining active chain candidates in the set of active chain candidates after removing those chain candidates that were marked inactive from the set of active chain candidates is less than 2.

Referring to the example discussed above, since the number of remaining active chain candidates in the set of active chain candidates is not less than 2 (set of active chain candidates includes chain candidates A, B and D), the process of operations 706-711 is repeated once more.

When such operations (operations 706-711) are repeated, chain candidates A, B and D cannot be extended. As a result, chain candidate A ends with a listing of variable offsets of (1→2→5→10), chain candidate B ends with a listing of variable offsets of (21→22→25→30), chain candidate C ends with a listing of variable offsets of (41→42→45) and chain candidate D ends with a listing of (61→62→65→70).

Referring to operation 711, if the number of remaining active chain candidates in the set of active chain candidates is less than 2, then, in operation 712, address expression modifier 202 of register pressure mitigation system 104 generates new base addresses for each identified chain (chains identified in operation 602) within an identified loop (loop identified in operation 601).

For example, referring to FIG. 4, address expression modifier 202 generates new base addresses (e.g., base+base1, base+base2, base+base3, base+base4) for the smaller chains 401 (chain candidates A, B, C and D) of the identified chain (chain identified in operation 602). In one embodiment, address expression modifier 202 generates such new base addresses by generating a random address (e.g., base1, base2, base3, base4) to be appended to the previous base address (e.g., base). In one embodiment, address expression modifier 202 utilizes various software tools for generating such new base addresses by generating a random address to be appended to the previous base address, including, but not limited to, Mockeroo, DTM Data Generator, E-Naxos DataGen, Data Factory, etc.

In operation 713, address expression modifier 202 of register pressure mitigation system 104 modifies the address expressions for the load and store instructions in each identified chain (chains identified in operation 602) to share the variable offsets of a chain candidate (e.g., chain candidate A) among the other chain candidates (e.g., chain candidates B, C and D), where the chain candidates correspond to the smaller chains 401 of the identified chain (chain identified in operation 602). For example, as discussed above, chain candidate A ends with a listing of variable offsets of (1→2→5→10), chain candidate B ends with a listing of variable offsets of (21→22→25→30), chain candidate C ends with a listing of variable offsets of (41→42→45) and chain candidate D ends with a listing of variable offsets of (61→62→65→70). As a result, chain candidates (small chains 401) A, B, C and D may share the indexes offset*1, offset*2, offset*5 and offset*10 based on the listing of variable offsets of chain candidate A (1→2→5→10).

For example, the address expressions for the load and store instructions may be modified to include the new base address generated in operation 712 along with the shared offsets (e.g., offset*1, offset*2, offset*5 and offset*10). As a result, the address expression for the load/store instructions for a small chain 401 (e.g., chain candidate A) may correspond to base+base1+offset1, base+base1+offset2, base+base1+offset5 and base+base1+offset10. The address expression for the load/store instructions for another small chain 401 (e.g., chain candidate B) may correspond to base+base2+offset1, base+base2+offset2, base+base2+offset5 and base+base2+offset10 and so forth. In this manner, register pressure is reduced by reusing variable offsets among the newly created smaller chains 401 (see operation 705). That is, by reusing common variable offsets, there are less variable offsets that need to be stored in the registers thereby mitigating register pressure.

In one embodiment, address expression modifier 202 selects the chain candidate (e.g., chain candidate A) to share its variable offsets among the other chain candidates based on its listing of variable offsets having the greatest number of variable offsets after completion of extending the active chain candidates.

In one embodiment, address expression modifier 202 utilizes various software tools for modifying the address expressions for the load and store instructions as discussed above, including, but not limited to, SonarQube®, Synopsis® Coverity, Snyk® Code, etc.

As a result of the foregoing, embodiments of the present disclosure mitigate or even eliminate register spills.

Furthermore, the principles of the present disclosure improve the technology or technical field involving register pressure of loops. As discussed above, if there are not enough registers to hold all the variables, some variables may be moved to and from memory (e.g., RAM). This process is called "spilling" the registers. Accessing memory (e.g., RAM) is significantly slower than accessing registers and so a compiled program runs slower. Therefore, an optimizing compiler aims to assign as many variables to available free registers as possible. "Register pressure" measures the availability of free registers at any point in time during the program execution. That is, register pressure corresponds to the number of simultaneously live variables at an instruction. Register pressure is high when a large number of the available registers are in use; thus, the higher the register pressure, the more often the register contents must be spilled into memory. Increasing the number of registers in an architecture decreases register pressure but increases the cost. Register pressure is especially an issue involving certain applications, such as artificial intelligence and machine learning applications, which utilize an enormous amount of data that is computationally intensive. In such applications, data may involve a large number of variables and computations, which may result in high register pressure, which may result in spills (storing the variables in memory) and reloads (loading stored variables from memory) inside a hot loop (a region of instructions where a large amount of time is spent during the program's execution). There have been various register allocation algorithms (e.g., greedy register allocation, linear scan register allocation, Partitioned Boolean Quadratic Problem) developed in an attempt to minimize register pressure. Unfortunately, such attempts have failed to adequately reduce register pressure, including in situations involving hot loops.

Embodiments of the present disclosure improve such technology by identifying loops of a computer program (also simply referred to as a "program") with a number of live variables that exceeds a threshold number, such as the number of available registers with capacity to store data. Such identified loops may be the to be subject to high register pressure, in which the number of live variables exceeds the number of available registers with capacity to store data. Upon identifying such loops in the computer program, chains within each identified loop are identified, where each chain includes load and store instructions from the same induction address and where the variable offsets of the load and store instructions are loop invariants. A "chain," as used herein, refers to an ordered set of operations. An "induction address," as used herein, refers to the base address that is utilized by the variables of the loop. A "base address," as used herein, refers to the address serving as a reference point ("base") for other addresses, such as the addresses for the variables. For example, a variables address may correspond to the base address plus an "offset address." An "offset address," as used herein, refers to the number of address locations added to the base address in order to obtain a specific absolute address. A "loop invariant," as used herein, refers to a condition that is true at the beginning and the end of every iteration of the loop. The address expressions for the load and store instructions in the identified chains may then be modified or changed to reuse common variable offsets using the analysis and transformation process discussed herein. By reusing common variable offsets, there are less variable offsets that need to be stored in the registers thereby mitigating register pressure. Furthermore, in this manner, there is an improvement in the technical field involving register pressure of loops.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for reducing register pressure comprises identifying loops of a program with a number of live variables that exceeds a threshold number. The method further comprises identifying one or more chains within each identified loop, where each of the one or more chains comprises load and store instructions from a same induction address, and where variable offsets of the load and store instructions are loop invariants. The method additionally comprises modifying addresses expressions for the load and store instructions in each of the one or more chains to reuse common variable offsets.

Furthermore, in one embodiment of the present disclosure, the method additionally comprises identifying variable offsets in an identified chain to form a group of variable offsets. Furthermore, the method comprises sorting variable offsets in the group of variable offsets to form a sorted list of variable offsets. Additionally, the method comprises computing a delta between any two adjacent variable offsets in the sorted list of variable offsets forming a set of deltas. In addition, the method comprises selecting a most frequent delta value from the set of deltas. The method further comprises selecting one or more pairs of variable offsets in the sorted list of variable offsets as an initial set of active chain candidates of a chain of the one or more chains in which a difference in value between a selected pair of variable offsets corresponds to the selected delta value.

Additionally, in one embodiment of the present disclosure, the method further comprises computing a delta between a last variable offset in each of the active chain candidates and a next adjacent variable offset in the sorted list of variable offsets. The method additionally comprises identifying a most frequent delta among computed deltas. Furthermore, the method comprises extending each active chain candidate among the active chain candidates to include a subsequent variable offset in response to a difference in value between a last variable offset of the active chain candidate and the subsequent variable offset in the sorted list of variable offsets equaling the identified most frequent delta.

Furthermore, in one embodiment of the present disclosure, the method additionally comprises marking a chain candidate among the active chain candidates to be inactive in response to the chain candidate not being able to be extended.

Additionally, in one embodiment of the present disclosure, the method further comprises continuing to compute the delta between the last variable offset in each of the active chain candidates and the next adjacent variable offset in the sorted list of variable offsets, identify the most frequent delta among the computed deltas and extend each active chain candidate among the active chain candidates to include a subsequent variable offset in response to the difference in value between the last variable offset in the active chain candidate and the subsequent variable offset in the sorted list of variable offsets equaling the identified most frequent delta until a number of active chain candidates is less than 2.

Furthermore, in one embodiment of the present disclosure, the method additionally comprises generating new base addresses for each of the one or more chains.

Additionally, in one embodiment of the present disclosure, the method further comprises modifying address expressions for the load and store instructions in the chain of the one or more chains to share variable offsets of a chain candidate of the initial set of active chain candidates among other chain candidates of the initial set of active chain candidates in response to completing an extension of active chain candidates.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for reducing register pressure, the method comprising:
   identifying loops of a program with a number of live variables that exceeds a threshold number;
   identifying one or more chains within each identified loop, wherein each of the one or more chains comprises load and store instructions from a same induction address, wherein variable offsets of the load and store instructions are loop invariants; and
   modifying addresses expressions for the load and store instructions in each of the one or more chains to reuse common variable offsets.

2. The method as recited in claim 1 further comprising:
   identifying variable offsets in an identified chain to form a group of variable offsets;
   sorting variable offsets in the group of variable offsets to form a sorted list of variable offsets;
   computing a delta between any two adjacent variable offsets in the sorted list of variable offsets forming a set of deltas;
   selecting a most frequent delta value from the set of deltas; and
   selecting one or more pairs of variable offsets in the sorted list of variable offsets as an initial set of active chain candidates of a chain of the one or more chains in which a difference in value between a selected pair of variable offsets corresponds to the selected delta value.

3. The method as recited in claim 2 further comprising:
   computing a delta between a last variable offset in each of the active chain candidates and a next adjacent variable offset in the sorted list of variable offsets;
   identifying a most frequent delta among computed deltas; and
   extending each active chain candidate among the active chain candidates to include a subsequent variable offset in response to a difference in value between a last variable offset of the active chain candidate and the subsequent variable offset in the sorted list of variable offsets equaling the identified most frequent delta.

4. The method as recited in claim 3 further comprising:
   marking a chain candidate among the active chain candidates to be inactive in response to the chain candidate not being able to be extended.

5. The method as recited in claim 3 further comprising:
   continuing to compute the delta between the last variable offset in each of the active chain candidates and the next adjacent variable offset in the sorted list of variable offsets, identify the most frequent delta among the computed deltas and extend each active chain candidate among the active chain candidates to include a subsequent variable offset in response to the difference in value between the last variable offset in the active chain candidate and the subsequent variable offset in the sorted list of variable offsets equaling the identified most frequent delta until a number of active chain candidates is less than 2.

6. The method as recited in claim 3 further comprising:
   generating new base addresses for each of the one or more chains.

7. The method as recited in claim 6 further comprising:
   modifying address expressions for the load and store instructions in the chain of the one or more chains to share variable offsets of a chain candidate of the initial set of active chain candidates among other chain candidates of the initial set of active chain candidates in response to completing an extension of active chain candidates.

8. A computer program product for reducing register pressure, the computer program product comprising one or more computer readable storage mediums having program code embodied therewith, the program code comprising programming instructions for:
   identifying loops of a program with a number of live variables that exceeds a threshold number;
   identifying one or more chains within each identified loop, wherein each of the one or more chains comprises load and store instructions from a same induction address, wherein variable offsets of the load and store instructions are loop invariants; and
   modifying addresses expressions for the load and store instructions in each of the one or more chains to reuse common variable offsets.

9. The computer program product as recited in claim 8, wherein the program code further comprises the programming instructions for:
   identifying variable offsets in an identified chain to form a group of variable offsets;
   sorting variable offsets in the group of variable offsets to form a sorted list of variable offsets;
   computing a delta between any two adjacent variable offsets in the sorted list of variable offsets forming a set of deltas;
   selecting a most frequent delta value from the set of deltas; and
   selecting one or more pairs of variable offsets in the sorted list of variable offsets as an initial set of active chain candidates of a chain of the one or more chains in which a difference in value between a selected pair of variable offsets corresponds to the selected delta value.

10. The computer program product as recited in claim 9, wherein the program code further comprises the programming instructions for:
    computing a delta between a last variable offset in each of the active chain candidates and a next adjacent variable offset in the sorted list of variable offsets;
    identifying a most frequent delta among computed deltas; and
    extending each active chain candidate among the active chain candidates to include a subsequent variable offset in response to a difference in value between a last variable offset of the active chain candidate and the subsequent variable offset in the sorted list of variable offsets equaling the identified most frequent delta.

11. The computer program product as recited in claim 10, wherein the program code further comprises the programming instructions for:

marking a chain candidate among the active chain candidates to be inactive in response to the chain candidate not being able to be extended.

12. The computer program product as recited in claim 10, wherein the program code further comprises the programming instructions for:

continuing to compute the delta between the last variable offset in each of the active chain candidates and the next adjacent variable offset in the sorted list of variable offsets, identify the most frequent delta among the computed deltas and extend each active chain candidate among the active chain candidates to include a subsequent variable offset in response to the difference in value between the last variable offset in the active chain candidate and the subsequent variable offset in the sorted list of variable offsets equaling the identified most frequent delta until a number of active chain candidates is less than 2.

13. The computer program product as recited in claim 10, wherein the program code further comprises the programming instructions for:

generating new base addresses for each of the one or more chains.

14. The computer program product as recited in claim 13, wherein the program code further comprises the programming instructions for:

modifying address expressions for the load and store instructions in the chain of the one or more chains to share variable offsets of a chain candidate of the initial set of active chain candidates among other chain candidates of the initial set of active chain candidates in response to completing an extension of active chain candidates.

15. A system, comprising:

a memory for storing a computer program for reducing register pressure; and a processor connected to the memory, wherein the processor is configured to execute program instructions of the computer program comprising:

identifying loops of a program with a number of live variables that exceeds a threshold number;

identifying one or more chains within each identified loop, wherein each of the one or more chains comprises load and store instructions from a same induction address, wherein variable offsets of the load and store instructions are loop invariants; and modifying addresses expressions for the load and store instructions in each of the one or more chains to reuse common variable offsets.

16. The system as recited in claim 15, wherein the program instructions of the computer program further comprise:

identifying variable offsets in an identified chain to form a group of variable offsets;

sorting variable offsets in the group of variable offsets to form a sorted list of variable offsets;

computing a delta between any two adjacent variable offsets in the sorted list of variable offsets forming a set of deltas;

selecting a most frequent delta value from the set of deltas; and selecting one or more pairs of variable offsets in the sorted list of variable offsets as an initial set of active chain candidates of a chain of the one or more chains in which a difference in value between a selected pair of variable offsets corresponds to the selected delta value.

17. The system as recited in claim 16, wherein the program instructions of the computer program further comprise:

computing a delta between a last variable offset in each of the active chain candidates and a next adjacent variable offset in the sorted list of variable offsets;

identifying a most frequent delta among computed deltas; and extending each active chain candidate among the active chain candidates to include a subsequent variable offset in response to a difference in value between a last variable offset of the active chain candidate and the subsequent variable offset in the sorted list of variable offsets equaling the identified most frequent delta.

18. The system as recited in claim 17, wherein the program instructions of the computer program further comprise:

marking a chain candidate among the active chain candidates to be inactive in response to the chain candidate not being able to be extended.

19. The system as recited in claim 17, wherein the program instructions of the computer program further comprise:

continuing to compute the delta between the last variable offset in each of the active chain candidates and the next adjacent variable offset in the sorted list of variable offsets, identify the most frequent delta among the computed deltas and extend each active chain candidate among the active chain candidates to include a subsequent variable offset in response to the difference in value between the last variable offset in the active chain candidate and the subsequent variable offset in the sorted list of variable offsets equaling the identified most frequent delta until a number of active chain candidates is less than 2.

20. The system as recited in claim 17, wherein the program instructions of the computer program further comprise:

generating new base addresses for each of the one or more chains.

* * * * *